Oct. 19, 1948.            J. A. ARMSTRONG              2,451,528
        METHOD FOR SEPARATING WORM-DAMAGED NUTS FROM
        SOUND NUTS BY IMMERSION IN A GRAVITY LIQUID
                    Filed June 28, 1943
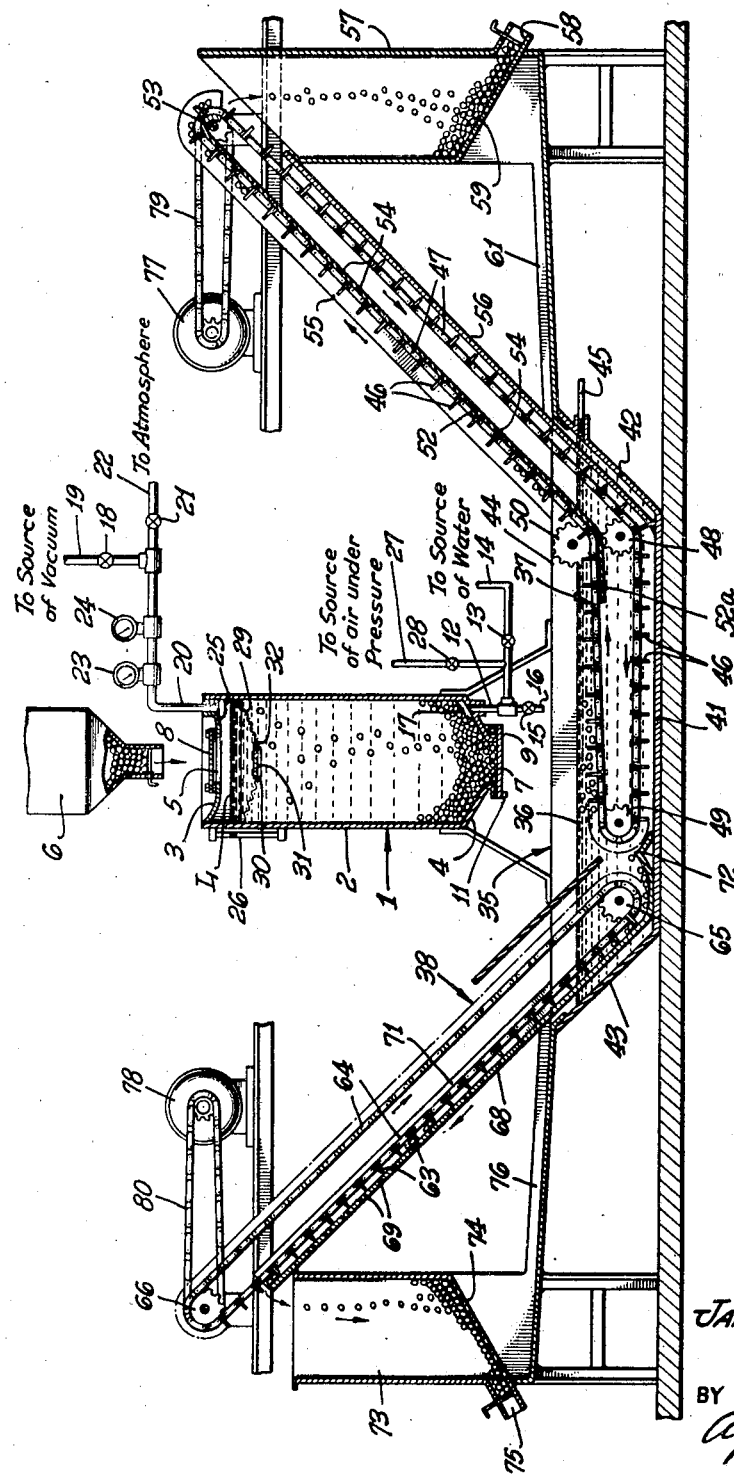
JAMES A. ARMSTRONG,
    INVENTOR.
BY
    Alfred W. Knight
        ATTORNEY.

Patented Oct. 19, 1948

2,451,528

UNITED STATES PATENT OFFICE 2,451,528

METHOD FOR SEPARATING WORM-DAMAGED NUTS FROM SOUND NUTS BY IMMERSION IN A GRAVITY LIQUID

James A. Armstrong, Downey, Calif.

Application June 28, 1943, Serial No. 492,524

6 Claims. (Cl. 209—3)

This invention relates to the separation of worm-damaged nuts from sound nuts, and the principal object of the invention is to provide a method by which such separation may be made effectively and economically.

The method described herein is particularly applicable and of the greatest importance in connection with the separation of worm-damaged English walnuts and filberts, but is applicable also to other similar products such as pecans, black walnuts, almonds, Brazil nuts, hickory nuts and fruit seeds such as apricot, peach, prune and cherry pits. All of these products have a relatively hard and impervious outer shell, within which is contained an edible or otherwise useful kernel, and the invention may be applied to any such products whenever it is desired to separate those which have been damaged by worms. The term "nuts" as used hereinafter will be understood to include all such products.

In the preparation of nuts for the market, the separation of worm-damaged nuts from sound undamaged nuts is a difficult and expensive operation and one which, in certain nut groups such as the English walnut and filbert, is becoming more serious each year as the industry becomes more concentrated and predatory insects become more abundant and adapt their life cycles and food preferences to those crops.

Heretofore the only practical method of separating these worm-damaged nuts has been to sort them out by hand, based on visual inspection thereof. In this hand sorting operation, the basis used for selecting and separating the worm-damaged nuts is the presence of a hole in the shell, made by the worm, all nuts having such a hole in the shell being assumed to be worm-damaged. This hole is usually small and difficult to see, hence a very careful examination is required in order to determine which nuts should be removed.

It is necessary to remove practically all the wormy nuts in order to permit the remaining nuts to pass the standard fixed by Federal inspectors of food-stuffs. In the case of filberts the problem is further complicated because the worm, in seeking a nut that is in suitable condition for it to attack, will visit quite a large number of nuts and leave thereon marks having somewhat the same appearance as the holes left in the nuts which are actually entered. Thus, the sorters are confused and often remove good nuts that have been so marked in the belief that they are worm-damaged. Because of this added difficulty, the sorting process is either rendered unduly slow and expensive in order to carefully select all nuts that are actually worm-damaged without removing any of the sound nuts, or else a considerable number of undamaged nuts are also removed, in order to reduce the time required in sorting. Consequently, this hand sorting method of removing wormy nuts, is at best, a slow, difficult, expensive and generally unsatisfactory operation.

A particular object of the present invention is to provide for the effective and substantially complete separation of worm-damaged nuts from sound nuts, while avoiding inadvertent removal of sound nuts with the worm-damaged nuts.

Another particular object of the invention is to provide a method whereby the worm-damaged nuts may be separated rapidly and at less expense than by the hand-sorting method heretofore used.

In the method of the present invention, the whole nuts, including perforate-shelled worm-damaged nuts, are immersed in water or other suitable liquid, and the pressure on the liquid and the immersed nuts is thereafter substantially increased so as to cause some of the liquid to enter and partially fill the worm-damaged nuts through the hole left in the shell by the worm. This materially increases the specific gravity of these worm-damaged nuts, while the specific gravity of the sound, imperforate-shelled nuts remains substantially unchanged. By then subjecting the nuts to gravity separation in water or other suitable liquid medium, the worm-damaged nuts may be caused to sink to the bottom of the liquid and the sound nuts to float at the surface thereof, and the worm-damaged and sound nuts may thereupon be separately removed. This gravity separating operation may be referred to as a flotation treatment.

In most cases, the sound nuts are lighter than water due to the buoyant effect of the air contained therein, while partial replacement of the contained air by water will cause the specific gravity to become greater than that of water. Hence, water is generally the preferred liquid medium for use both in the immersing and pressure increasing operations and in the subsequent flotation or gravity separating operation, by reason of its relatively great availability at low cost. However, it is to be understood that any other suitable liquid may be employed which is not injurious to the sound nuts, and that if desired, sodium chloride or other soluble salt may be dissolved in the water to increase the specific gravity thereof, either in the immersing and pressure increasing operations or in the subsequent separation step.

In the preferred embodiment of the process, the nuts are immersed in liquid at sub-atmospheric pressure, either by first immersing the nuts in the liquid and thereafter reducing the pressure on the liquid and the immersed nuts, or by reducing the pressure on the nuts below atmospheric pressure and thereafter immersing them in the liquid while under subatmospheric pressure. This removes part of the air from the interior of the perforate-shelled wormy nuts. The pressure of the liquid and upon the immersed nuts is thereafter increased to atmospheric pressure or greater, to cause some of the liquid to enter the perforate-shelled nuts. However, it is also within the scope of the invention to immerse the nuts in liquid at substantially atmospheric pressure and thereafter apply a pressure materially in excess of atmospheric pressure to cause the liquid to enter the perforate-shelled nuts and replace part of the air contained therein.

An apparatus suitable for the practice of my invention is illustrated in the accompanying drawing, which is a longitudinal vertical section thereof. The apparatus shown comprises, generally, an enclosed chamber 1 in which the nuts are subjected to an increase in pressure while immersed in a liquid, a tank 35 adapted to contain a body of liquid indicated at 36 to which the nuts are delivered from chamber 1, and in which they are subjected to a gravity separation or flotation operation, and separate conveying means indicated generally at 37 and 38 for removing from said tank the sound nuts which float at the surface of the liquid and the worm-damaged nuts which fall to the bottom thereof.

The chamber 1 is shown as comprising a vertically disposed cylindrical shell 2, and upper end wall 3, and a lower end wall 4. The upper end wall 3 is provided with a charging opening 5 through which the nuts may be introduced into chamber 1 in any desired manner, as from a feed hopper 6 located above said opening. The lower end wall 4 is provided with a discharge opening 7 through which the nuts may be delivered from the chamber 1 into the liquid medium in tank 35. The chamber 1 is shown as positioned directly above said tank at a position intermediate the end walls thereof, so that the nuts delivered through opening 7 will fall directly into the liquid therein. It will of course be understood that any desired number of chambers 1 may be provided, arranged in suitable positions above or adjacent tank 35 and provided, if necessary, with suitable conveying means for delivering nuts from each of said chambers into said tank.

The openings 5 and 7 are shown as being located centrally of chamber 1, and the walls 3 and 4 preferably slope downwardly and inwardly toward said openings to facilitate the introduction and discharge of the nuts. Suitable closure means are provided for said openings, comprising for example a door or cover plate 8 bolted or otherwise removably secured to the upper end wall 3 and a door or plate 9 hingedly mounted on the lower end wall 4 and provided with retaining means such as bolt 11 for holding it in closed position. The closure members 8 and 9 may thus be moved to closed and open positions with respect to openings 5 and 7 respectively.

The chamber 1 is constructed to withstand the external or internal pressure to which it is to be subjected in operation, and suitable gasket means may be provided for maintaining a tight seal between the closure members 8 and 9 and the corresponding wall portions of the chamber.

A pipe 12 leads into the chamber 1, preferably through lower end wall 4, and is connected through valve 13 to a pipe 14 for supplying water or other liquid medium and through valve 15 to a liquid outlet or drain pipe 16 which preferably opens above or within tank 35. A screen or other perforate shield member 17 is preferably provided within chamber 1 immediately over the end of pipe 12 to prevent nuts from entering said pipe or clogging the open end thereof.

A pipe 20 leads into the upper portion of chamber 1, preferably through the upper end wall 3, and is connected through valve 18 and pipe 19 to a vacuum pump or other suitable source of vacuum for withdrawing air from the chamber, and through valve 21 to a pipe 22 which opens to the atmosphere. The pipe 20 is provided with a vacuum gauge 23 and may, if desired, be also provided with a pressure gauge 24. A screen 25 is shown within chamber 1 below the pipe 20 to prevent nuts from entering or clogging said pipe. Suitable means such as gauge glass 26 may be provided for indicating the liquid level in the chamber 1.

In case it is desired to introduce into the chamber 1 air at superatmospheric pressure, I may also provide a pipe 27 connected through valve 28 to pipe 12 and leading to an air compressor or other suitable source of air under pressure.

The liquid level in chamber 1 is preferably maintained somewhat below the upper end thereof during the immersing and pressure-increasing operations, so that air removed from the perforate-shelled nuts may escape freely at the liquid surface and liquid will not be drawn into the pipe 20. I therefore prefer to provide means within the chamber for limiting upward movement of nuts which tend to rise to the surface of the liquid, in order that all the nuts will be held beneath the surface of the liquid. For this purpose, a screen or other perforate member 29 is provided, which extends across the chamber a short distance below the upper end thereof. The openings therein are sufficiently small to prevent upward movement of the nuts therethrough. Member 29 is shown as sloping downwardly and inwardly from the wall of the chamber to a central opening 30 through which the nuts may be delivered into the space below said member, after which the opening may be closed by a door 31 hingedly mounted at 32 to permit upward opening movement thereof, and adapted to be held in closed position either by its own weight or by suitable latch means. The operator can open and close said door 31 by reaching through opening 5 at the top of the chamber.

This separation tank 35 comprises a bottom wall 41 and side and end walls of any suitable height, the tank being open at its upper end. The end walls 42 and 43 are shown as sloping inwardly and downwardly, while the side walls (one of which is shown at 44) preferably extend substantially vertically. For maintaining the desired liquid level in said tank and discharging excess liquid therefrom I may provide a liquid overflow pipe 45 opening into the tank and leading to any suitable point of discharge, and it will be understood that this pipe may if desired be provided with any suitable well-known means, such as a float-controlled valve, for maintaining and adjusting the liquid level.

The conveying means indicated generally at 37 serves to remove from the liquid in tank 35 the nuts that float at the surface thereof. Said conveying means is shown as comprising a plurality of spaced strips or other conveying elements 46 arranged to extend transversely across substantially the entire width of the tank and secured at their ends to suitable transporting means such as endless chains, which move in the direction indicated by the arrows. One of these chains is shown at 47, and it will be understood that two such chains are preferably provided, one adjacent each side wall of the tank. These chains pass over and engage sprocket members, as indicated at 48, 49 and 50, which are carried by shafts rotatably mounted on the side walls of the tank. The sprockets 48 and 49 are so arranged as to guide the conveying means along and above, and in close proximity to, the bottom wall 41 from a position adjacent the right end of the tank to a position intermediate the ends thereof and preferably beyond the position at which the nuts are delivered into the tank from chamber 1. From this position, the conveying means is guided by sprockets 49 and 50 so as to move in the reverse direction along a path adjacent but preferably somewhat below the surface of the body of liquid in the tank, preferably directly across the region from which the nuts are delivered to the tank, and to a point adjacent the right end of the tank. In this latter portion of its travel, the conveying means preferably has a slight upward inclination so as to gradually engage and remove the nuts that float at the surface of the liquid, it being understood that the floating nuts will be conveyed toward the right end of the tank, not only due to direct engagement by the conveying elements 46 but also due to the motion of the liquid caused by the movement of these conveying elements therethrough, the floating nuts being thus conveyed toward the right end of the tank until they are finally engaged by the gradually rising conveying elements 46.

From the right end of the tank, the conveying means passes upwardly along and immediately above an inclined plate 52, over a drive sprocket 53, and thence downwardly and back into the tank. Plate 52 is preferably provided with perforations as indicated at 54 to permit liquid to drain therethrough from the nuts moving upward along said plate. Said plate is also shown as provided with side walls extending upward therefrom as at 55, in close proximity to the ends of the conveying strips 46. The lower end portion 52a of plate 52 extends into the body of liquid in tank 35 and below the portion of the conveying means immediately in advance of sprocket 50. An inclined plate 56 may be provided below the lower return run of the conveying means for returning to the tank 35 any liquid draining through the perforations 54.

A bin or hopper 57 is provided for receiving the nuts discharged from the upper end of the conveying means as it passes over sprocket 53, and said bin is shown as provided at its lower end with a discharge opening 58 and a perforate bottom wall 59, through which additional liquid is permitted to drain from the nuts and is returned to tank 35 by means of trough 61.

In addition to removing the floating nuts from the tank, conveying means 37 also assists in the removal of the nuts which sink to the bottom of the tank. The lower run of said conveying means engages these nuts and moves them toward the left, along the bottom of the tank, to the position of sprocket 49. From this position, these nuts are removed from the tank by the conveying means indicated generally at 38. Conveying means 38 is shown as being similar to conveying means 37, comprising a plurality of suitably spaced transversely extending strips or other conveying elements 63, secured at their ends to suitable transporting means such as endless chains 64. Said chains pass over sprockets 65 at their lower ends and over drive sprockets 66 at their upper ends, and move in the direction indicated by the arrows.

The lower run of conveying means 38 carries the nuts upwardly along an inclined plate 68, which may also be provided with perforations as indicated at 69 for drainage of liquid from the nuts, and with side walls 71 extending upward therefrom in close proximity to the ends of the conveyor strips 63. At its lower end, plate 68 is provided with an inverted V-shaped portion 72 positioned at the bottom of tank 35 and between the ends of the two conveyors, to guide and direct the nuts from the left end of conveyor 37, into position for engagement by conveyor 38.

At its upper end, plate 68 terminates somewhat below sprockets 66, in position to discharge the nuts into a bin 73, said bin being similar to the above described bin 57 and provided with a perforate sloping bottom wall 74, a discharge opening 75 and a trough 76 for returning liquid to tank 35.

The conveyors may be driven in any suitable manner, for example by means of electric motors 77 and 78 provided with suitable speed reducing means and connected by drive chains 79 and 80 to the shafts of drive sprockets 53 and 66, respectively.

In carrying out the process in the above described apparatus, tank 35 may be filled with water or other liquid, up to the desired level, for example, by introducing water through supply pipe 14 and valves 13 and 15. A suitable quantity of nuts, including imperforate-shelled sound nuts and perforate-shelled worm-damaged nuts, is then introduced into chamber 1 as described above. The chamber is then tightly closed, and water introduced from supply pipe 14 through valve 13, and pipe 12, filling the chamber to a level above the top of the nuts and preferably somewhat above screen 29, as indicated, for example, at L. Gauge glass 26 permits observation of the liquid level, and screen 29 serves to hold all of the nuts below the surface of the liquid. It will of course be understood that the water or other liquid may be introduced into chamber 1 before introducing the nuts, after which the liquid level may be adjusted by introducing additional liquid or drawing off excess liquid through valve 15. With the other valves closed, valve 18 is then opened, connecting the interior of chamber 1 to the source of vacuum, and air is removed from the chamber until the desired condition of reduced pressure is established. Any desired degree of partial evacuation may be employed, for example, the pressure may be reduced to from 1 to 5 lbs. per square inch, or to less than 1 lb. per square inch, absolute pressure.

Air is thus removed from the interior of the worm-damaged nuts, through the openings in the shells thereof, the proportion of air so removed depending of course upon the degree of vacuum employed, the time during which the vacuum is maintained, and the size of the openings in the worm-damaged nuts. After the withdrawal of this air from the perforate-shelled nuts is complete, the pressure in chamber 1 is increased to atmospheric pressure or above. If atmospheric pressure is to be used this may be done by admitting additional water from supply line 14, or by admitting air at atmospheric pressure by opening either valve 21 or valve 15. If it is desired to employ superatmospheric pressure, this may be done by supplying water at suitable pressure from supply line 14 through valve 13, or by supplying air at suitable pressure from line 27 through valve 28.

The increased pressure thus produced causes liquid to enter and partially fill the perforate-shelled nuts, thus increasing the specific gravity thereof.

Various modifications may be made in the process. For example, chamber 1 may be partially evacuated to reduce the pressure on the nuts below atmospheric pressure and remove air from the perforate-shelled nuts, before introducing liquid into said chamber, in which case the liquid so introduced will immediately enter the partially evacuated perforate-shelled nuts. However, the introduction of the water will increase the pressure in the chamber and, unless an extremely high vacuum is first established, it will generally be necessary to withdraw additional air during or after the introduction of the water in order to make sure that all of the perforate-shelled nuts are immersed at reduced pressure.

As another alternative the nuts may be immersed in water, within chamber 1, at atmospheric pressure, and a superatmospheric pressure then applied, for example, an absolute pressure of 25 lbs. per square inch or more. In this case, I prefer to increase the pressure to 50 lbs. per square inch, absolute pressure, or more, either by admitting water under pressure from supply pipe 14 or by admitting air under pressure from supply line 27. The increased hydrostatic pressure on the liquid causes part of the liquid to enter the perforate-shelled nuts. When the pressure is subsequently reduced to atmospheric pressure prior to discharging the nuts from chamber 1, part of the air will escape from the perforate-shelled nuts, leaving them partially filled with liquid which serves to increase their specific gravity.

Agitation of the nuts within chamber 1 may, if desired, be produced by air agitation caused by introduction of air at the bottom of the chamber. If the pressure in the chamber is below atmospheric such air for agitation purposes may be introduced by opening valve 15 and admitting air at atmospheric pressure, and valve 18 may also be opened at the same time so as to remove air from the top of the chamber. If the pressure within the chamber is at atmospheric pressure or above, air for agitation purposes may be introduced under higher pressure, from supply line 27, and valve 21 may be open slightly at the same time so as to allow part of the air so introduced to escape to the atmosphere.

It will also be understood that the above described operations of immersing the nuts in the liquid at one pressure and thereafter increasing the pressure may be repeated as many times as desired, in order to obtain the desired degree of partial filling with liquid of the perforate-shelled nuts.

After the treatment of the nuts in chamber 1 is completed, the nuts are discharged therefrom into tank 35, by opening the door 9 at the bottom of said chamber, it being understood that if superatmospheric pressure has been employed the pressure is preferably reduced to atmospheric before opening said door. The rate of delivery of the nuts from chamber 1 into tank 35 may be controlled by holding the door 9 in partly open position, or by successively opening and closing said door at suitable intervals.

Upon entering the body of liquid 36 in tank 35, the sound imperforate-shelled nuts, being of less specific gravity than the liquid, are caused to float at the surface of the liquid and are removed by conveying means 37 and delivered to bin 57 as described above, while the partially liquid-filled worm-damaged nuts, being of greater specific gravity than the liquid, sink to the bottom of the tank and are removed by conveying means 38 and delivered to bin 73.

In the treatment of English walnuts or other nuts whose shells are composed of sections, care should be exercised not to change the condition of pressure too rapidly in order to avoid the possibility of opening the shells of sound nuts and causing them to become partly filled with liquid. Likewise, for best results, such sectional-shelled nuts are preferably treated while in a "green" condition (that is, in ripened but undried condition) because of the tendency in some cases for the sections of the shell to separate on drying.

I claim:

1. The method of separating whole perforate-shelled worm-damaged nuts from whole imperforate-shelled nuts which comprises immersing the nuts in a liquid, then subjecting the liquid and the immersed nuts to a substantial increase in pressure to cause some of the liquid to enter and partially fill the perforate-shelled nuts, and thereafter subjecting the nuts to gravity separation in a liquid medium to separate the liquid-containing perforate-shelled nuts from the imperforate-shelled nuts.

2. The method of separating whole perforate-shelled worm-damaged nuts from whole imperforate-shelled nuts which comprises immersing the nuts in a liquid under subatmospheric pressure, then increasing the pressure in the liquid and upon the immersed nuts to at least atmospheric pressure to cause some of the liquid to enter and partially fill the perforate-shelled nuts, and thereafter subjecting the nuts to gravity separation in a liquid medium to separate the liquid-containing perforate-shelled nuts from the imperforate-shelled nuts.

3. The method of separating whole perforate-shelled worm-damaged nuts from whole imperforate-shelled nuts which comprises immersing the nuts in a liquid at substantially atmospheric pressure, then materially reducing the pressure in the liquid and upon the immersed nuts to remove part of the air from the perforate-shelled nuts, then increasing the pressure in the liquid and upon the immersed nuts to at least atmospheric pressure to cause some of the liquid to enter and partially fill the perforate-shelled nuts, and thereafter subjecting the nuts to gravity separation in a liquid medium to separate the liquid-containing perforate-shelled nuts from the imperforate-shelled nuts.

4. The method of separating whole perforate-shelled worm-damaged nuts from whole imperforate-shelled nuts which comprises reducing the pressure upon the nuts to materially below atmospheric pressure to remove part of the air from the perforate-shelled nuts, then immersing the nuts in a liquid while under subatmospheric pressure, then increasing the pressure in the liquid and upon the immersed nuts to at least atmospheric pressure to cause some of the liquid to enter and partially fill the perforate-shelled nuts, and thereafter subjecting the nuts to gravity separation, in a liquid medium to separate the liquid-containing perforate-shelled nuts from the imperforate-shelled nuts.

5. The method of separating whole perforate-shelled worm-damaged nuts from whole imperforate-shelled nuts which comprises immersing the nuts in a liquid, then subjecting the liquid and the immersed nuts to a substantal increase in pressure to cause some of the liquid to enter and partially fill the perforate-shelled nuts, then introducing the nuts into a body of liquid whose specific gravity is intermediate that of the imperforate-shelled nuts and the partially liquid filled perforate-shelled nuts and in which the nuts are free to move under the influence of gravity, so as to cause the imperforate-shelled nuts to float at the surface, and the perforate-shelled nuts to sink to the bottom, of said body of liquid, and separately removing from said body of liquid the nuts that float and those that sink.

6. The method of separating whole perforate-shelled worm-damaged nuts from whole imperforate-shelled nuts which comprises immersing the nuts in an aqueous solution containing a dissolved salt and having a greater specific gravity than water, subjecting said aqueous solution and immersed nuts to a substantial increase in pressure to cause some of the solution to enter and partially fill the perforate-shelled nuts, and thereafter subjecting the nuts to gravity separation in water to separate the solution-containing perforate-shelled nuts from the imperforate-shelled nuts.

JAMES A. ARMSTRONG.

REFERENCES CITED

The following references are of record in the file of this patent:

UNITED STATES PATENTS

| Number | Name | Date |
| --- | --- | --- |
| 854,987 | Dunning | May 28, 1907 |
| 1,757,103 | Voigt | May 8, 1930 |
| 2,216,050 | Romberg | Sept. 24, 1940 |
| 2,225,459 | Palmrose | Dec. 17, 1940 |
| 2,241,737 | Romberg | May 13, 1941 |